United States Patent [19]

Hisamatsu et al.

[11] 4,078,616
[45] Mar. 14, 1978

[54] TRACK-TYPE VEHICLE FRAME

[75] Inventors: Masanori Hisamatsu, Komatsu; Toshikatsu Okano, Mikawa, both of Japan

[73] Assignee: Kabushiki Kaisha Komatsu Seisakusho, Tokyo, Japan

[21] Appl. No.: 661,851

[22] Filed: Feb. 27, 1976

[30] Foreign Application Priority Data

Mar. 11, 1975 Japan .................................. 50-28619

[51] Int. Cl.² .............................................. E02F 3/76
[52] U.S. Cl. .................................. 172/801; 180/9.48; 305/16; 305/60
[58] Field of Search ............................. 172/801, 805; 180/9.2 R, 9.48, 9.52, 9.62, 9.64; 305/16–18, 39, 54, 60

[56] References Cited

U.S. PATENT DOCUMENTS

| 1,974,520 | 9/1934 | Stewart | 172/801 |
| 2,125,327 | 8/1938 | Baker et al. | 180/9.62 |
| 2,304,075 | 12/1942 | Davidson et al. | 172/801 |
| 2,734,292 | 2/1956 | Graves | 172/801 X |
| 3,005,275 | 10/1961 | Febre | 172/801 X |
| 3,580,341 | 5/1971 | Terrell | 172/805 |
| 3,674,105 | 7/1972 | Egli | 180/9.48 |
| 3,685,592 | 8/1972 | Frisbee | 172/801 |
| 3,920,081 | 11/1975 | Terai et al. | 172/801 |

FOREIGN PATENT DOCUMENTS 491,852 4/1953 Canada .................................. 180/9.48

*Primary Examiner*—Paul E. Shapiro
*Attorney, Agent, or Firm*—Armstrong, Nikaido & Marmelstein

[57] ABSTRACT

A frame for a crawler tractor designed to permit selective mounting of at least two pairs of endless track assemblies of different widths, together with bulldozer assemblies of different configurations suitable for use with the respective pairs of track assemblies. The tractor frame comprises a pair of laterally spaced, rigidly interconnected main frame members, and track frame means bracketed to the opposite sides of the main frame members. A selected pair of track assemblies are mounted on the usual sprockets and idlers arranged adjacent the front and rear ends of the track frame means. A pair of lift cylinders are supported in predetermined positions over the main frame members so as to be made common use of by both types of bulldozer assemblies.

4 Claims, 6 Drawing Figures

TRACK-TYPE VEHICLE FRAME

BACKGROUND OF THE INVENTION

This invention relates to vehicle frames, and more particularly to a frame for a track-type earthmoving vehicle. The invention has particular reference to track-type or crawler tractors equipped with bulldozer assemblies, but with no unnecessary limitations thereto being intended.

Earthmoving vehicle manufacturers usually make two different types of track-type tractors to be equipped with, for example, bulldozer assemblies. One type is intended for operation on normal or dry ground, and the other type for operation in wet or swampy areas. Such different types of tractors, having different frames, have been required because the endless track assemblies for use in swamps or the like are wider than those used on dry ground, and also because implement assemblies, such as bulldozer assemblies, or different configurations are employed in conjunction with the respective track assemblies of the different widths.

This conventional practice, however, is objectionable in view of large installations required for the manufacture of the two different types of tractor-implement units, and of the inevitably high manufacturing costs. Users, too, are required to purchase at unnecessarily high expenses the different types of machines for use under different soil conditions.

SUMMARY OF THE INVENTION

It is an object of this invention to provide a track-type vehicle frame which lends itself for use with track assemblies of different widths and with implement assemblies of correspondingly different configurations, so that the same vehicle can be used, for example, on both dry and swampy regions merely by interchanging the track and implement assemblies.

It is also an object of this invention to provide a track-type vehicle frame including lift cylinder means mounted in predetermined position thereon which can be utilized in common by the implement assemblies of different configurations, as for selectively raising and lowering bulldozer blades of different widths relative to the vehicle.

With these and other objects in view, this invention is directed, in brief, to the provision of a vehicle frame system comprising a pair of spaced, rigidly interconnected main frame members generally extending in the longitudinal direction of the vehicle, and track frame means arranged on opposite sides of the main frame members and secured thereto. At least two pairs of endless track assemblies of different widths can be selectively mounted on sprockets and idlers rotatably supported adjacent the rear and front ends of the track frame means. Implement assemblies of different configurations, suitable for use with the respective pairs of track assemblies, can be also selectively mounted on the front of the vehicle. The vehicle frame system further includes fluid actuated cylinder means supported over the main frame members and adapted to selectively raise and lower a work implement, such as bulldozer blade, of a selected implement assembly relative to the vehicle.

The invention thus permits the use of the same frame system for the different vehicle functions, so that the manufacturing cost for each type of vehicle-implement combination can be made significantly lower than when different frames are employed. Moreover, users are no longer required to purchase two different types of vehicle-implement combination for operation on dry and swampy regions.

The features which are believed to be novel and characteristic of this invention are set forth in particular in the appended claims. The invention itself, however, both as to its organization and manner of operation, together with the further objects and advantages thereof, will become apparent from the study of the following description, with reference had to the accompanying drawings in which like reference characters refer to like parts throughout.

DESCRIPTION OF THE PREFERRED EMBODIMENT

Figure 1:
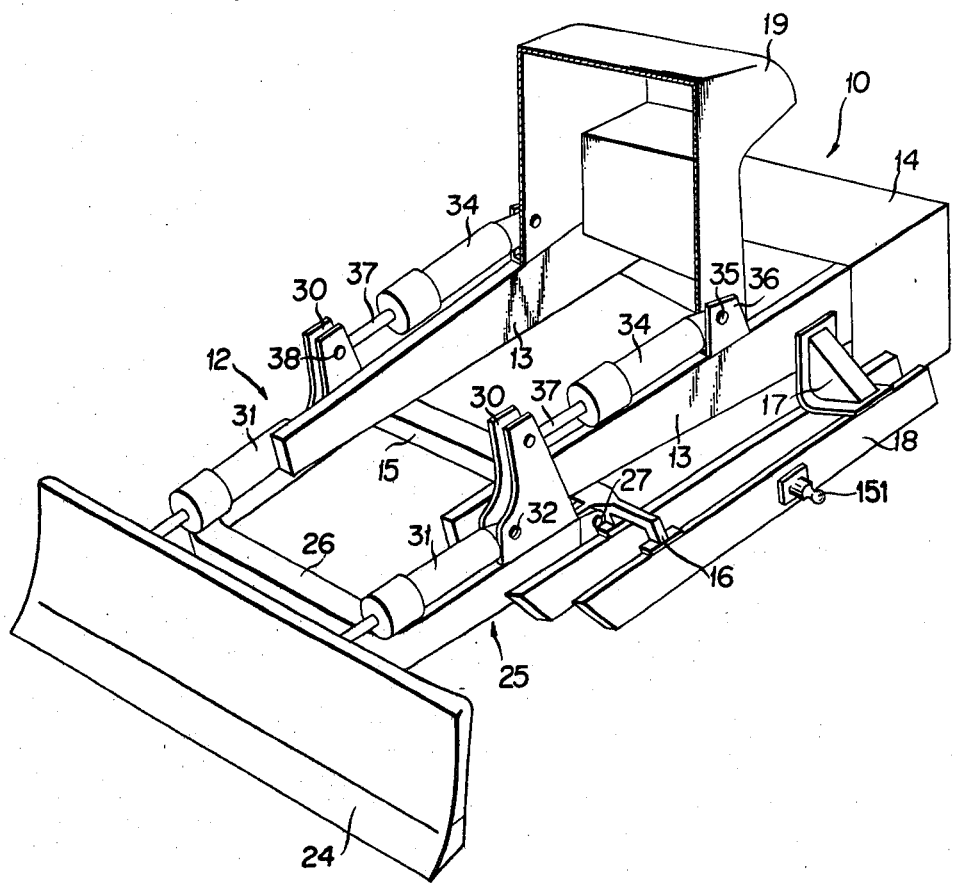
FIG. 1 is a perspective view of a preferred form of the vehicle frame according to this invention, the vehicle frame being shown equipped with a bulldozer assembly suitable for use with track assemblies of smaller width to be mounted on the frame.
Figure 2:
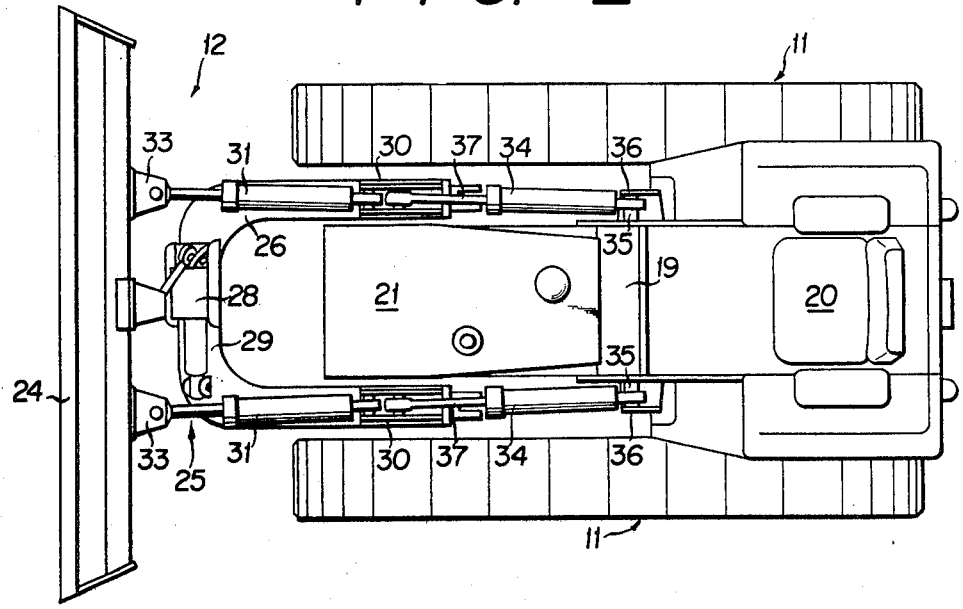
FIG. 2 is a top plan view of a completed tractor-bulldozer combination incorporating the frame and bulldozer assembly of FIG. 1 and the track assemblies of smaller width.
Figure 3:
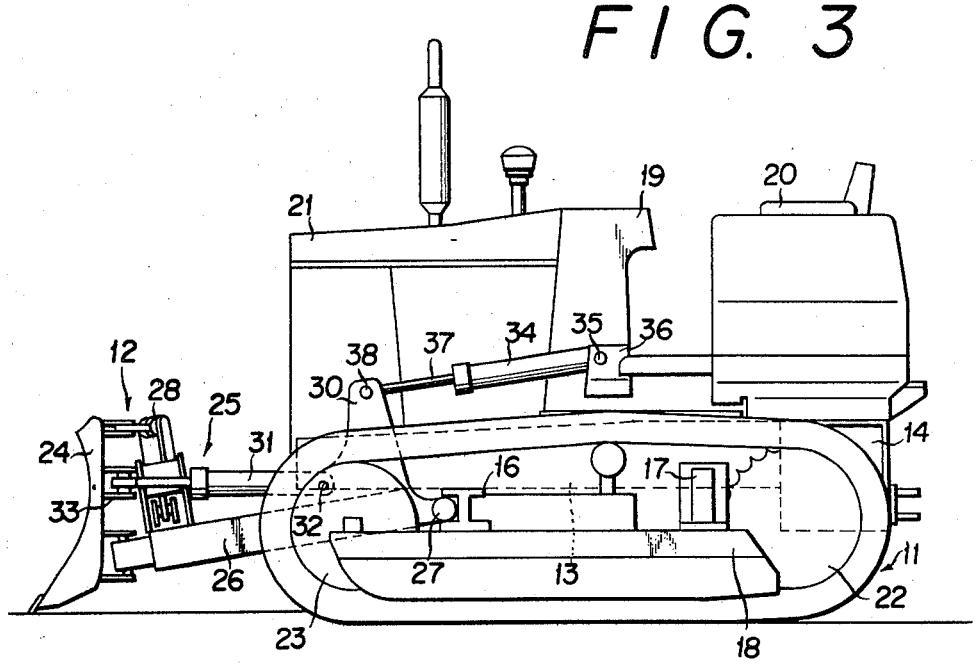
FIG. 3 is a side elevational view of the tractor-bulldozer combination of FIG. 2.

In FIGS. 1 through 3 of the drawings, a main vehicle body 10 according to the invention is shown adapted for a crawler tractor having a pair of interchangeable endless track assemblies 11 of relatively small width for operation under normal or dry soil conditions and an implement assembly, such as an interchangeable bulldozer assembly 12, suitable for use with such relatively narrow track assemblies.

With particular reference to FIG. 1, the main vehicle body 10 includes a pair of substantially parallel spaced main frame members 13 generally extending in the longitudinal direction of the vehicle and rigidly interconnected at their rear ends by a main housing 14 which can be used to accommodate desired tractor power train components. At or adjacent their front ends the main frame members 13 are rigidly interconnected by a crossbar 15 having its opposite ends projecting laterally outwardly beyond the respective main frame members to terminate in a pair of front brackets 16. These front brackets cooperate with a pair of rear brackets 17 to support a pair of track frame means 18 on opposite sides of the main frame members 13. Each of the track frame means 18 is positioned substantially parallel to the main frame member 13 with a spacing therebetween suitable for the mounting of a below mentioned pair of endless track assemblies of greater width than the endless track assemblies 11. A control console 19 of suitable configuration is shown to be fixedly mounted on the main frame members 13, in a position suitably spaced forwardly from the main housing 14.

FIGS. 2 and 3 illustrate the completed tractor-bulldozer combination incorporating the main vehicle body 10. Mounted on the vehicle frame are an operator's seat 20 arranged rearwardly of the control console 19, with a suitable spacing therebetween, and an enclosure 21 containing the usual power plant, including an engine, of the tractor.

Each endless track assembly 11 extends over a reversible track sprocket 22 and a track idler 23 rotatably supported adjacent the rear and front ends, respectively, of the track frame means 18 on each side of the tractor. The track assemblies 11 are powerably driven by the sprockets 22 to propel the tractor-bulldozer combination in the usual manner.

As will be seen also from FIG. 1, the bulldozer assembly 12 comprises a work implement in the form of a blade 24 arranged forwardly of the main vehicle body 10, and interchangeable linkage 25 operatively interconnecting the blade and the vehicle frame. The linkage 25 includes a C-frame 26 pivotally connected at both ends to the respective front brackets 16 as by pivot pins 27.

It will be observed from FIGS. 2 and 3 that the bulldozer assembly 12 in this particular adaptation of the vehicle frame according to the invention is of the combined angling-tilting type, including a swivel connection 28 of any known or suitable construction operatively connecting the blade 24 to the C-frame 26. A tilt cylinder 29 is operatively connected between the C-frame 26 and swivel connection 28 to cause the tilting motion of the blade relative to the frame.

The linkage 25 further includes two laterally spaced pairs of lift arms or brackets 30 fixedly mounted on, and extending upwardly from, the pair of oppositely located limbs of the C-frame 26. A pair of angle cylinders 31 arranged over the opposed limbs of the C-frame 26 have their head ends pivotally connected at 32 between the respective lift arm pairs 30. The piston rods of these angle cylinders extend forwardly for pivotal connection to the blade 24 via respective laterally spaced pairs of brackets or lugs 33 mounted on its back. Thus, when either of the angle cylinders 31 is extended, with simultaneous retraction of the other angle cylinder, the blade 24 will be angled relative to the C-frame 26.

A pair of lift cylinders 34 arranged over the respective main frame members 13 have their head ends pivotally pinned at 35 to brackets 36 which can be secured either to the lateral faces of the control console 19 or to the main frame members. The lift cylinders 34 have their piston rods 37 pivotally pinned at 38 to the top ends of the respective lift arm pairs 30. Upon selective retraction and extension of the lift cylinders 34, therefore, the blade 24 can be raised and lowered relative to the tractor via the linkage 25, since then the C-frame 26 pivots about the pivot pins 27.

Figure 4:
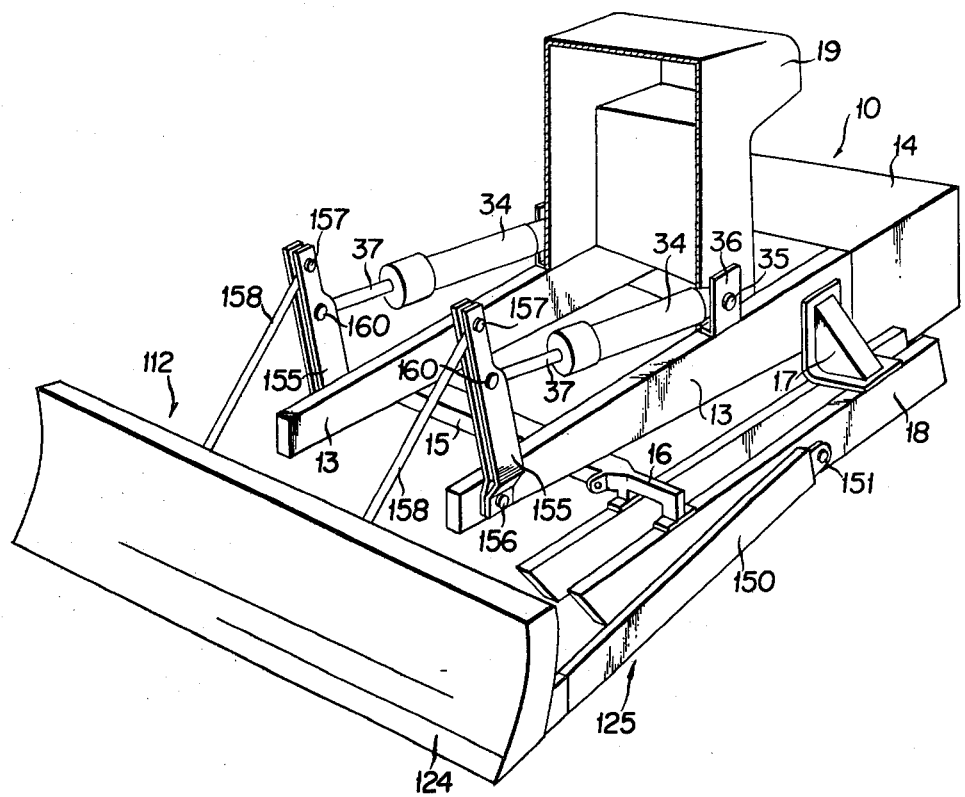
FIG. 4 is a perspective view of the inventive vehicle frame of FIG. 1 as equipped with a bulldozer assembly suitable for use with track assemblies of greater width to be mounted on the frame.
Figure 5:
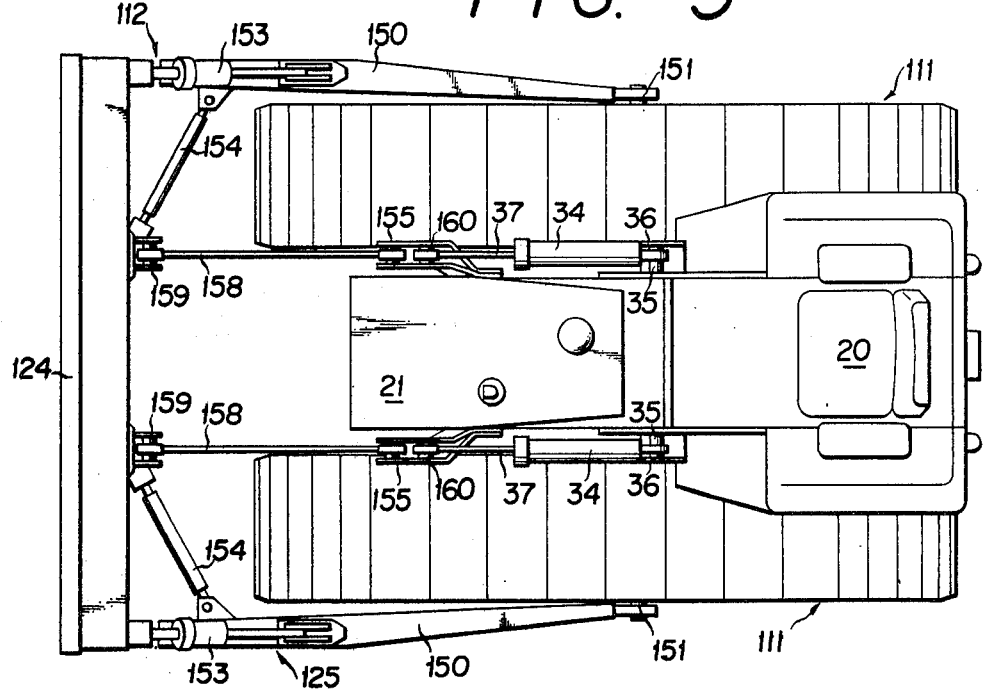
FIG. 5 is a top plan view of a completed tractor-bulldozer combination incorporating the frame and bulldozer assembly of FIG. 4 and the track assemblies of greater width.
Figure 6:
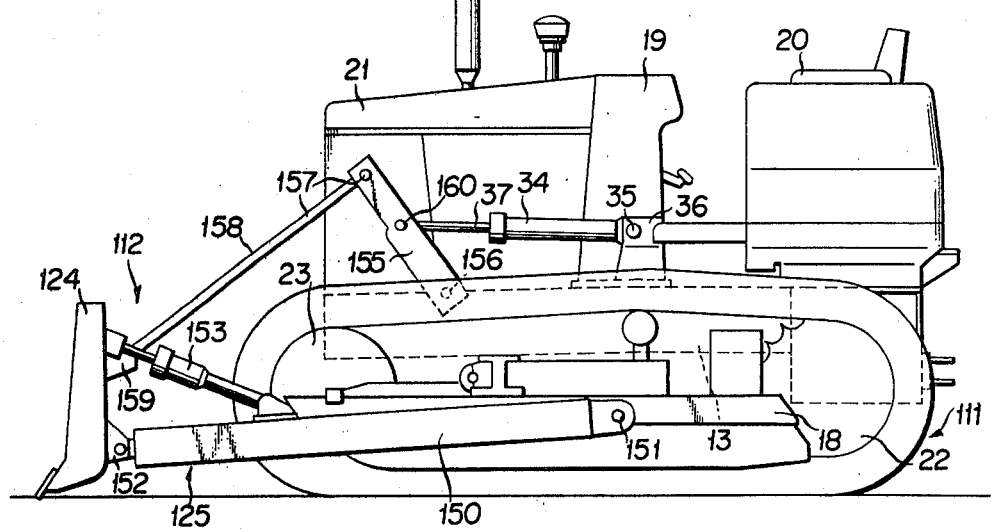
FIG. 6 is a side elevational view of the tractor-bulldozer combination of FIG. 5.

In FIGS. 4 through 6, the main vehicle body 10 of the above construction is shown adapted for a crawler tractor having a pair of interchangeable endless track assemblies 111 of greater width than the track assemblies 11, for operation in swamps or similar regions, and an interchangeable bulldozer assembly 112 for use with such wide track assemblies.

It will be evident from comparison of FIGS. 1 and 4 that the basic components of the main vehicle body 10 are common to both of these adaptations, such common components being identified in FIGS. 4 through 6 by the same reference numerals as those used in FIGS. 1 through 3. Also common to both adaptations are the operator's seat 20, the power plant enclosure 21, the reversible track sprockets 22, and the track idlers 23. As in the FIGS. 1 through 3 adaptation, the track assemblies 111 extend over the sprockets 22 and idlers 23 and are powerably driven by the sprockets to propel the tractor-bulldozer combination in the known manner.

The bulldozer assembly 112 comprises a blade 124 arranged forwardly of the main vehicle body 10, and interchangeable linkage 125 operatively interconnecting the blade and the vehicle frame. The blade 124 is greater than the blade 24 in width, that is, in the dimension in the transverse direction of the tractor.

The linkage 125 includes a pair of push arms 150 arranged outboard with respect to the track assemblies 111. These push arms are pivotally supported at their rear ends by trunnions 151 projecting from respective substantially intermediate portions of the outer side wall of the track frame means 18 and are pivotally coupled at their front ends to opposite sides of the blade 124 via brackets 152. A pair of tipping jacks 153 are operatively connected between the blade 124 and the push arms 150 for tipping the blade forward and backward as desired. A pair of blade strusts 154 are also operatively connected between the blade and push arms.

The linkage 125 further includes two laterally spaced pairs of lift levers 155 pivotally pinned by trunnions 156 projecting from respective forward portions of the outer side walls of the main frame members 13 to the respective main frame members 13 of the main vehicle body 10. It will be noted from FIG. 5 that the lift lever pairs 155 are arranged between the power plant enclosure 21 and the track assemblies 111 of the tractor. The top ends of these lift lever pairs are pivotally pinned at 157 to a pair of lift links 158, respectively, that extend forwardly for pivotal connection to the blade 124 via laterally spaced pairs of brackets 159 mounted on its back.

As in the preceding adaptation of the main vehicle body 10, shown in FIGS. 1 through 3, the pair of lift cylinders 34 are arranged over the respective main frame members 13 and have their head ends pivotally connected by the pins 35 to the brackets 36 which can be secured either to the lateral faces of the control console 19 or to the main frame members. The piston rods 37 of these lift cylinders are pivotally pinned at 160 to the respective lift lever pairs 155.

Thus, upon selective retraction and extension of the lift cylinders 34, the lift lever pairs 155 are pivoted backward and forward about their pivot pins 156. Such pivotal motion of the lift lever pairs are transmitted via the lift links 158 to the blade 124, so that the blade can be raised and lowered relative to the tractor since then the push arms 150 pivot about the trunnions 151 pivotally connecting their rear ends to the tracks frame means.

It is noteworthy that in the FIGS. 1 through 3 adaptation of the vehicle frame according to this invention, the linkage 25 of the bulldozer assembly 12 is located inboard with respect to the track assemblies 11. This arrangement permits the bulldozer blade to be reduced in width to an extent suitable for handling usual loads in earthmoving operation on normal or hard soil. The machine with the blade of such reduced width is also convenient for transportation as on a trailer.

In the FIGS. 4 through 6 adaptation of the vehicle frame, on the other hand, the pair of push arms 150 of the bulldozer assembly 112 are arranged outboard with respect to the track assemblies 111 of greater width than the track assemblies 11. This arrangement results in a substantial decrease in the amount of dirt or the like which will adhere to the bulldozer linkage during operation on wet ground, with the consequent reduction of the power loss caused by the increased weight of the machine.

With the invention thus fully described, it is clear that the objects as above stated have been accomplished in a simple and practical manner. However, since numerous modifications and changes will readily occur to those skilled in the art, it is not desired to limit the invention to the exact constructional and operational details disclosed, and accordingly all suitable modifications and equivalents may be resorted to falling within the scope of the invention.

We claim:

1. A frame system, for use with a track-type vehicle, selectively mounting thereon at least two pairs of interchangeable endless track assemblies of different widths via track sprockets and track idlers rotatably supported adjacent the rear and front ends, respectively, of said frame system, in combination with at least two types of interchangeable implement assemblies suitable for use with said pairs of endless track assemblies, respectively, said implement assemblies respectively including interchangeable work implements of different lateral widths, each positioned forwardly of the vehicle, and interchangeable linkages of different types suitable for use with said work implements, respectively, each linkage operatively connecting a selected one of said work implements to said frame system, said vehicle frame system comprising:
   a pair of main frame members generally extending in a longitudinal direction of the vehicle with a spacing therebetween;
   means for rigidly interconnecting said main frame members; track frame means arranged on opposite sides of said main frame member, respectively, each of said track frame means being positioned substantially parallel with the main frame member with a spacing therebetween suitable for mounting of one of said endless track assemblies having greater width than the other endless track assemblies;
   means for securing said track frame means to said main frame members;
   said pairs of track assemblies being adapted to be selectively mounted on the track sprockets and track idlers rotatably supported adjacent the rear and front ends, respectively, of said track frame means; and
   fluid actuated cylinder means supportably arranged over said main frame members, respectively, to selectively raise and lower a selected one of the work implements relative to the vehicle via a selected one of the linkages corresponding to the selected work implement;
   a pair of first trunnions projecting from respective substantially intermediate portions of the outer side walls of said track frame means, each pivotally and detachably supporting one of said linkages connecting one of said work implements having greater lateral width for use with said endless track assemblies of greater width to the track frame means; and a pair of second trunnions projecting from respective forward portions of the outer side walls of said main frame members, each pivotally and detachably supporting said other work implement of smaller lateral width for use with said other endless track assemblies of smaller width.

2. The vehicle frame system as set forth in claim 1, wherein one implement assembly is designed for use with one of the pairs of track assemblies of smaller width, said one implement assembly having a linkage positioned inboard with respect to said track frame means, and wherein another implement assembly is designed for use with one of the pairs of track assemblies of greater width, said another implement assembly having a linkage including a pair of pivotal push arms positioned outboard with respect to said track frame means, respectively 3. The vehicle frame system as set forth in claim 2, wherein the linkage of said one implement assembly comprises:
   a C-frame pivotally connected to the securing means for securing the track frame means to the main frame members, the work implement of said one implement assembly being movable up and down with said C-frame relative to the vehicle; and lift arms means fixedly mounted on said C-frame and operativly connected to said cylinder means for permitting the work implement to be selectively raised and lowered by said cylinder means relative to the vehicle.

4. The vehicle frame system as set forth in claim 2 wherein the linkage of said other implement assembly comprises:
   lift lever means pivotally mounted on said main frame members and operatively connected to said cylinder means; and
   lift link means operatively connecting said lift lever means to the work implement of said other implement assembly for permitting the work implement to be selectively raised and lowered by said cylinder means relative to the vehicle.

* * * * *